B. G. LAMME & J. L. McK. YARDLEY.
SWITCHING DEVICE.
APPLICATION FILED OCT. 31, 1913.
1,138,673.
Patented May 11, 1915.
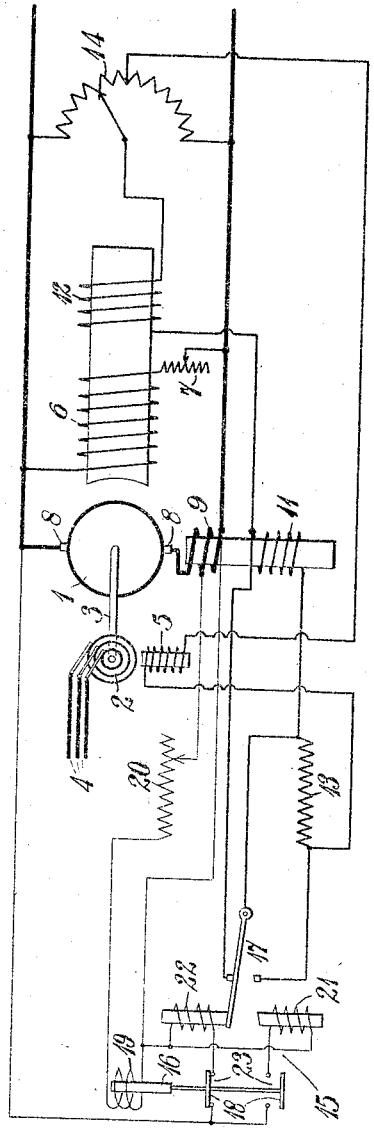
WITNESSES:
Fred H Miller
D. C. Davis.
INVENTORS
Benjamin G. Lamme
& John L. McK. Yardley
BY
Wiley G Carr
ATTORNEY

UNITED STATES PATENT OFFICE.

BENJAMIN G. LAMME AND JOHN L. McK. YARDLEY, OF PITTSBURGH, PENNSYLVANIA, ASSIGNORS TO WESTINGHOUSE ELECTRIC AND MANUFACTURING COMPANY, A CORPORATION OF PENNSYLVANIA.

SWITCHING DEVICE.

1,138,673.  Specification of Letters Patent.  Patented May 11, 1915.

Application filed October 31, 1913. Serial No. 798,507.

*To all whom it may concern:*

Be it known that we, BENJAMIN G. LAMME and JOHN L. McK. YARDLEY, citizens of the United States, and residents of Pittsburgh, in the county of Allegheny and State of Pennsylvania, have invented a new and useful Improvement in Switching Devices, of which the following is a specification.

Our invention relates to switching devices, and it has special reference to automatically operated switching devices to be employed preferably in connection with the operation of synchronous booster rotary converters.

The object of our invention is to provide a simple, reliable and effective automatic means for overcoming certain difficulties that have been encountered in maintaining correct commutating conditions on machines of the above-indicated character.

By "synchronous booster rotary converter" we mean a machine combining a rotary converter and a mechanically associated alternating current booster which have their rotor windings connected in series circuit relation. The preferable design disposes both converter and booster on a single shaft. The field frames are adjacently mounted on a common bedplate and the series rotor connections are permanent, there being no slip rings on the converter proper. The purpose of the combination is to " boost " or " buck " the incoming alternating current voltage for maintaining a predetermined direct current voltage on the converter.

The total armature reaction of a rotary converter, that is, the resultant reaction obtained by integration around the entire armature circumference of the reacting effects of both the alternating and direct currents present during operation in the armature coils, is normally that of a motor, or, in other words, the alternating current reaction predominates. However, if we take simply the commutating zone, that is, the region directly beneath the commutator brushes, which region is, of course, all that we are concerned with when considering commutating conditions, it has been shown mathematically and proved by tests that the normal reaction in this zone is that of a generator, or, to state it differently, the direct current reaction is the greater.

The synchronous booster rotary converter has different electrical characteristics from the simple rotary converter, especially as regards armature reaction. In operating the combined machine, the excitation of the field coils of the booster may be reversed, thereby causing the generated voltage to raise or lower the voltage impressed at the collector rings. When the field is excited so that the voltage generated " bucks " the impressed voltage, the booster acts as a motor; when the field is excited so that the voltage generated " boosts " the impressed voltage, the booster acts as a generator. In the former case, the rotary converter, being partially driven by the booster, delivers some of its direct current energy as a generator. The additional generative or direct current armature reaction present under the brushes by reason of this generator action of the rotary, is, therefore, additively combined with the generative reaction of the simple converter. On the other hand, in the latter case, where the booster is acting as a generator, being driven by the converter acting partially as a motor, the motor action of the simple converter is correspondingly augmented, and the additional motor or alternating current reaction in the commutating zone, being in opposition to the above-mentioned generative reaction of the simple converter in this zone, is, consequently, subtracted therefrom.

From the foregoing theoretical considerations, it will be seen that the commutating field strength of the synchronous booster rotary converter must fulfil two requirements in order to successfully maintain good commutating conditions; first, the field strength must vary with the load current of the converter proper; and second, the field strength must vary according to the additional armature reaction introduced by the active operation of the booster, which reaction may be either positive or negative, as hereinbefore described. Heretofore, the first recited requirement has been recognized and fulfilled by means of a series commutating field winding connected in the main line, thus having load current flowing through the winding at all times. The second requirement, however, has caused considerable difficulty and the attempts made to attain the desired result have been more or less unsatisfactory.

According to our present invention, we provide a method for fulfilling both prescribed requirements. A series commutating field winding is provided for varying the commutating field strength in proportion to the load current; and an auxiliary commutating field winding, which is connected in series circuit relation with the shunt field winding of the booster, is employed for varying the commutating field strength in proportion to the additional armature reaction caused by the motor or generator effect previously referred to, as will be understood from the following statement: The additional armature reaction hereinbefore considered is proportional to the additional alternating or direct currents flowing in the rotary converter armature upon excitation of the booster, and, consequently, the reaction in question bears a readily determined relation to the field current of the booster. The pioneer system embracing the above principles is fully set forth in the co-pending application of J. L. McK. Yardley, Serial No. 757,379, filed March 28, 1913 and assigned to the Westinghouse Electric and Mfg. Co. However, under light load conditions, it has been found that the converter, when connected as above, is sometimes over-compensated particularly with maximum bucking action by the booster voltage, and is occasionally under-compensated especially with maximum boosting action by the booster voltage; that is, the commutating field may be either too strong or too weak, and sparking at the brushes may result. We therefore provide automatic means dependent upon load conditions for inserting in circuit or short-circuiting the commutating shunt field winding or any portion thereof. Naturally, this procedure by itself would change the resistance of the circuit under consideration: consequently, an undesirable value of current would flow in the booster field circuit and poor voltage regulation and commutating conditions on the converter would ensue. We, therefore, also provide means controlled by the said first means for automatically inserting in, and excluding from, the circuit a suitable resistor for maintaining approximately the same total resistance in the booster field circuit as before, simultaneously with the short-circuiting and the inclusion, respectively, of the auxiliary commutating field winding or portion thereof. In this way, substantially correct commutating conditions are automatically maintained on the rotary converter.

In the accompanying drawing, the single figure is a diagrammatic view of a combination dynamo-electric machine associated with an automatic switching device constructed in accordance with our invention.

Referring to the drawing, a rotary converter 1 is mechanically associated with an alternating current booster 2 by means of a shaft 3, and the rotor windings (not shown) of the two machines are connected in series circuit relation, as hereinbefore stated. A plurality of conductors 4 serve to connect the booster rotor to a suitable alternating current supply circuit (not shown). The booster 2 has a shunt field winding 5. The converter 1 is provided with a main shunt field winding 6 which is connected in series with a suitable rheostat 7 across the direct current terminals 8. In addition, the converter has a series commutating field winding 9 suitably connected in the main line, and a commutating shunt field and main auxiliary shunt field winding 11 and 12, respectively, which are connected in series circuit relation with the booster field winding 5, a resistor 13 and a reversing rheostat 14 across the direct current terminals 8. An automatic switching device 15 is associated with the last recited series circuit and comprises an auxiliary relay 16 and a main bridging member 17 that may be actuated thereby and that is adapted, in accordance with circuit conditions hereinafter described, to assume two different positions in which the member respectively short-circuits the commutating shunt field winding 11 and the resistor 13.

The relay 16 comprises movable and preferably biased bridging contact members 18, a coil 19 connected in series with a variable resistance 20, preferably across one-half of the series winding 9, for actuating the members 18 under predetermined conditions, and a pair of coils 21 and 22 for actuating the main bridging member 17 according to the position of the movable contact member 18. The coils 21 and 22 are severally connected across the direct current terminals 8 through gaps or openings 23 in the respective circuits, which gaps are adapted to be separately bridged by the contact members 18.

It will be understood that the purpose of the variable resistance 20 is to permit of adjustment of the action of the coil 19 upon the members 18 to correspond to the particular operating conditions.

Assuming that the machines 1 and 2 are operating under light-load conditions and that the parts of the switching device 15 occupy the positions shown, the coil 22 being energized through the upper contact member 18 which is biased to the lower position and the commutating shunt field winding, consequently, being short-circuited by the bridging member 17, the operation of the apparatus shown is as follows: When a predetermined load current has been attained, the voltage across the corresponding half of the series winding 9 will be high enough to send a sufficient current through the coil 19 to cause the contact members 18 to move to their other position, whereupon the coil 21 is energized through the lower member 18 and the bridging member 17 is, consequently, attracted to its other position, thus operatively inserting the commutating shunt field winding 11 in the circuit and simultaneously short-circuiting the resistor 13. The total commutating field strength will then be automatically maintained at a proper value to compensate for the changes in armature reaction of the converter, as hereinbefore described.

It will be understood that, when the load current drops back to a value below that which caused the above-indicated actuation of the members 18, the device 15 will automatically reassume the position shown in the drawing, the winding 11 being short-circuited and the resistor 13 being included in the circuit.

We do not wish to be restricted to the specific circuit connections and details of construction herein set forth, as many variations thereof may be made within the spirit and scope of our invention. We, therefore, desire that only such limitations shall be imposed as are indicated in the appended claims.

We claim as our invention:

1. The combination with a plurality of dynamo-electric machines mechanically associated and electrically connected in series circuit relation and provided with field magnet windings, of a circuit including certain of the windings of both machines, automatic means for eliminating a predetermined part of said circuit and means associated with said first means for simultaneously maintaining substantially constant electrical resistance in said circuit.

2. The combination with a plurality of dynamo-electric machines mechanically associated and electrically connected in series circuit relation and provided with field magnet windings, of a circuit including certain of the windings of both machines, automatic means for eliminating one of said windings from said circuit under predetermined conditions, and means dependent upon said first means for maintaining the total resistance of said circuit substantially constant.

3. The combination with a dynamo-electric machine adapted to deliver alternating and direct current and provided with a plurality of field windings, and a second dynamo-electric machine mechanically associated with said first machine and electrically connected in series therewith and provided with a field winding which is connected in series circuit with one of the field windings of said first machine, of a resistor, automatic means dependent upon the current in one of said windings for eliminating a certain winding from said series circuit, and means for thereupon inserting said resistor in said circuit.

4. The combination with a dynamo-electric machine adapted to deliver alternating and direct currents and provided with a series field and a plurality of shunt field windings, and a second dynamo-electric machine mechanically associated with said first machine and electrically connected in series therewith and provided with a shunt field winding which is connected in series circuit with one of the shunt field windings of said first machine, of a resistor having a resistance substantially equal to that of one of said shunt field windings, a switching device for eliminating that winding from said series circuit, means associated with said device for simultaneously inserting said resistor in said circuit, and a coil connected across another of the windings and dependent upon the current therein for actuating said switching device.

5. The combination with a dynamo-electric machine adapted to deliver alternating and direct current and provided with a main field winding and auxiliary series and shunt field windings, and a second dynamo-electric machine mechanically associated with said first machine and electrically connected in series therewith and provided with a shunt field winding which is connected in series circuit with the auxiliary shunt field winding of said first machine, of a resistor having a resistance substantially equal to that of said auxiliary shunt field winding, a switching device biased to short-circuit that winding and include said resistor in said series circuit, means associated with said device for opening the short-circuit and simultaneously eliminating said resistor, and a coil connected across a portion of said series field winding and depending upon the current therein for actuating said switching device from its biased position.

6. The combination with a dynamo-electric machine adapted to deliver alternating and direct current and provided with a main field winding and auxiliary series and shunt field windings, and a second dynamo-electric machine mechanically associated with said first machine and electrically connected in series therewith and provided with a shunt field winding which is connected in series circuit with the auxiliary shunt field winding of said first machine, of a resistor having a resistance substantially equal to that of said auxiliary shunt field winding, a multi-position switch for short-circuiting either said auxiliary shunt field winding or said resistor, a plurality of electro-magnetic means for severally positioning said switch upon energization, a circuit-closing member biased to cause a short-circuit of said auxiliary shunt field winding, and a coil connected across a portion of said series field winding and dependent upon a predetermined increase of current therein for actuating said circuit-closing member to cause a short-circuit of said resistor.

7. The combination with a rotary converter provided with a main field winding and auxiliary series and shunt field windings, and an alternating current booster mechanically associated with said converter and electrically connected in series therewith and provided with a shunt field winding which is connected in series circuit with the auxiliary shunt field winding of said converter, of a resistor having a resistance substantially equal to that of said auxiliary shunt field winding, a multi-position switch for short-circuiting either said auxiliary shunt field winding or said resistor, a plurality of magnet coils severally adapted, upon energization, to actuate said switch to its various positions, a movable contact member biased, under light load conditions, to energize the magnet that causes a short-circuit of said auxiliary shunt field winding, and a coil connected across a portion of said series field winding and dependent upon a predetermined increase of current therein for actuating said contact member to de-energize the previously energized magnet coil and to simultaneously energize the other magnet coil to short-circuit said resistor.

8. The combination with a dynamo-electric machine, of a booster therefor, a field circuit including the main field winding of the booster and a commutating field winding of the dynamo-electric machine, and means for shunting said commutating field winding out of said field circuit and for simultaneously inserting a resistance element therein of such value that the total resistance of said field circuit remains substantially constant.

9. The combination with a dynamo-electric machine, of a booster therefor, a field circuit including the main field winding of the booster and a commutating field winding of the dynamo-electric machine, means for reversing the direction of current flow in said field circuit, and means responsive to the load for shunting said commutating field winding out of said field circuit and for simultaneously inserting a resistance element therein of such value that the total resistance of said field circuit remains substantially constant.

In testimony whereof, we have hereunto subscribed our names this 18th day of Oct., 1913.

BENJ. G. LAMME.
JOHN L. McK. YARDLEY.

Witnesses:
B. B. HINES,
M. C. MERZ.